United States Patent
Tatehana et al.

(10) Patent No.: US 6,879,337 B2
(45) Date of Patent: Apr. 12, 2005

(54) PORTABLE TERMINAL DEVICE WITH CAMERA

(75) Inventors: Masami Tatehana, Yokohama (JP); Kenji Kino, Yokohama (JP); Hidehiro Yanagibashi, Kawasaki (JP); Yutaka Masutani, Yokohama (JP); Ichiro Kajiya, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 177 days.

(21) Appl. No.: 10/344,864
(22) PCT Filed: Aug. 16, 2002
(86) PCT No.: PCT/JP02/03778
§ 371 (c)(1), (2), (4) Date: Feb. 13, 2003
(87) PCT Pub. No.: WO02/100077
PCT Pub. Date: Dec. 12, 2002

(65) Prior Publication Data
US 2004/0051779 A1 Mar. 18, 2004

(30) Foreign Application Priority Data
May 31, 2001 (JP) ........................................ 2001-164923

(51) Int. Cl.⁷ ............................................... H04N 7/14
(52) U.S. Cl. .............................. 348/14.02; 379/433.13; 455/575.1
(58) Field of Search .......................... 348/14.01–14.16, 348/333.06, 375, 376, 373; 379/433.13, 428.01, 433.01; 455/556.1, 575.1, 575.3

(56) References Cited

U.S. PATENT DOCUMENTS

| | | | | |
|---|---|---|---|---|
| 6,069,648 A | * | 5/2000 | Suso et al. | 348/14.02 |
| 6,320,961 B1 | * | 11/2001 | Hayasaka | 379/433.13 |
| 6,396,924 B1 | * | 5/2002 | Suso et al. | 379/433.13 |
| 6,697,117 B1 | * | 2/2004 | Park | 348/373 |

FOREIGN PATENT DOCUMENTS

| | | |
|---|---|---|
| JP | 6-141306 | 5/1994 |
| JP | 11-8670 | 1/1999 |

* cited by examiner

*Primary Examiner*—Wing Fu Chan
(74) *Attorney, Agent, or Firm*—Pearne & Gordon LLP

(57) ABSTRACT

An object of the present invention is to provide a mobile terminal device with a camera, in which orientation of the camera can be easily adjusted in association with opening and closing motions of an upper case, and the camera can be protected from the exterior in association with a motion for folding the cases of the mobile terminal device, after photographing operation of the camera has been finished.

The mobile terminal device with a camera according to the present invention includes a lower case 1 provided with an operating part, an upper case 2 provided with a display part, a hinge part 3 for connecting the upper case 2 with the lower case 1 in a foldable manner, and a photographing part 6 rotatably an association mechanism 7 by which the photographing part 6 is rotated in association with opening and closing motions of the upper case 2.

6 Claims, 5 Drawing Sheets

PORTABLE TERMINAL DEVICE WITH CAMERA

TECHNICAL FIELD

This invention relates to a mobile terminal device with a camera which can be applied as a mobile phone set provided with a camera or a mobile television phone set.

BACKGROUND ART

In recent years, the mobile phone set has become widely used not only as a terminal set for simple vocal communication but also as a terminal set for data communication, with a remarkable rise of its data transmitting ability.

For example, as one of features to be utilized as this data communication terminal set, there has been proposed and developed a mobile phone set having such a structure that a camera is installed on the mobile phone set and an image data photographed by this camera can be transmitted and received in real time.

On the other hand, in this data communication terminal set, because various components such as a display, operating buttons, a microphone, a speaker, an antenna and so on, for example, must be efficiently contained in a limited narrow space, a place for installing the camera is restricted similarly.

Under such circumstances, there has been known a data communication terminal set with a camera which is so constructed that there is provided a cut-out part in a rectangular shape on a side face or a top face of the data communication terminal set, and a camera body is rotatably installed in this cut-out part. In such a data communication terminal set with a camera, it is possible to adjust the camera body so as to be directed in a desired direction and also so as to be directed to an operator himself, by installing the camera body in a rotatable manner.

DISCLOSURE OF THE INVENTION

In such a data communication terminal set with a camera, it has been necessary to provide an exclusive rotating mechanism separately for the purpose of rotatably installing the camera body. On that account, a mechanism as the data communication terminal set has become complicated, and also has led to an increase of cost. Particularly, in the data communication terminal set with a camera of a foldable type, two rotation mechanisms have been required, which has not been rational.

Under the circumstances, it has been proposed that in the terminal set of such a foldable type, the camera body is mounted to a hinge part for connecting an upper case to a lower case. However, in the data communication terminal set with the camera having such an arrangement, in case of adjusting direction for photographing with this camera, for example, by directly grasping the camera body with fingers, it has been difficult to perform fine adjustments of orientation of the camera, because the camera must be operated in a narrow space between the upper and the lower cases, and moreover, the camera body is relatively small. Further, in the case where the camera is directed to an exterior of the case for photographing, operation will become more difficult because the camera is not faced with the operator.

Still further, in such a data communication terminal set with a camera, after photographing with a lens of the camera directed outward, the lens of the camera may sometimes be forgotten to be returned inside. On such an occasion, the data communication terminal set may sometimes be carried while a cover glass and so on of the camera are kept exposed to the exterior, and there will be such a risk that the cover glass may get dirty or broken. In addition, it sometimes happens that after photographing, the photographing action of the camera may not be stopped carelessly, and the camera keeps on photographing. As the results, it is concerned that even private scenes may be transmitted to and seen by other people unnecessarily.

In view of the above described circumstances, it is an object of this invention to provide a mobile terminal device with a camera, in which orientation of the camera can be easily adjusted in association with opening and closing motions of an upper case, and the camera can be protected from the exterior in association with a motion for folding the cases of the mobile terminal device, after photographing operation of the camera has been finished.

As a first aspect, this invention provides a mobile terminal device with a camera comprising a lower case provided with an operating part, an upper case provided with a display part, a hinge part for connecting the upper case with the lower case in a foldable manner, and a photographing part installed in the hinge part, characterized in that there is provided an association mechanism by which the photographing part is rotated in association with opening and closing motions of the upper case so that the photographing part may be exposed to the exterior or retracted into the cases.

According to this aspect, the orientation of the camera can be easily adjusted in association with the opening and closing motions of the upper case, and the camera can be protected from the exterior in association with the motion for folding the cases of the mobile terminal device after the photographing operation has been finished.

Moreover, as a second aspect, the hinge part includes an upper hinge which is integral with the upper case and a lower hinge which is integral with the lower case, and the association mechanism includes a first friction member provided between the upper hinge and the photographing part, wherein the first friction member has preferably friction coefficient which is larger than friction coefficient between the lower hinge and the photographing part. With this structure, the photographing part can be rotated in association with the upper case by means of friction force.

Further, as a third aspect, the association mechanism includes a second friction member provided between the first friction member, the lower hinge and the photographing part, and the friction coefficient of the first friction member is preferably larger than friction coefficient of the second friction member. With this structure, it is possible to rotate and adjust the photographing part similarly in association with the upper case by means of friction force.

Further, as a fourth aspect, the first friction member may be a C-ring or an E-ring. According to this aspect, the association mechanism can be composed of simple components.

Further, as a fifth aspect, the C-ring or E-ring may be provided with bulging portions on its circumferential edge which are adapted to come into a point contact with the upper hinge.

Further, as a sixth aspect, the upper hinge and the lower hinge are preferably provided with restricting members for restricting rotation range of the photographing part, and the photographing part is preferably provided with a member to be restricted by the restricting members so that the rotation range of the photographing part may be restricted. According to this aspect, it is possible to prevent such a trouble that in the case where a lead wire is drawn out between the photographing part and the cases, the lead wire may be broken by an excessive rotation of the photographing part over one rotation.

Further, as a seventh aspect, a housing of the photographing part is formed by joining an upper housing and a lower housing, and a flexible circuit board for electrical connection between an interior of the photographing part and the upper or lower case may be drawn out through a joint portion between the upper and lower housings. According to this aspect, it will be possible to electrically connect the photographing part with other parts through the use of a slight gap.

Figure 1:
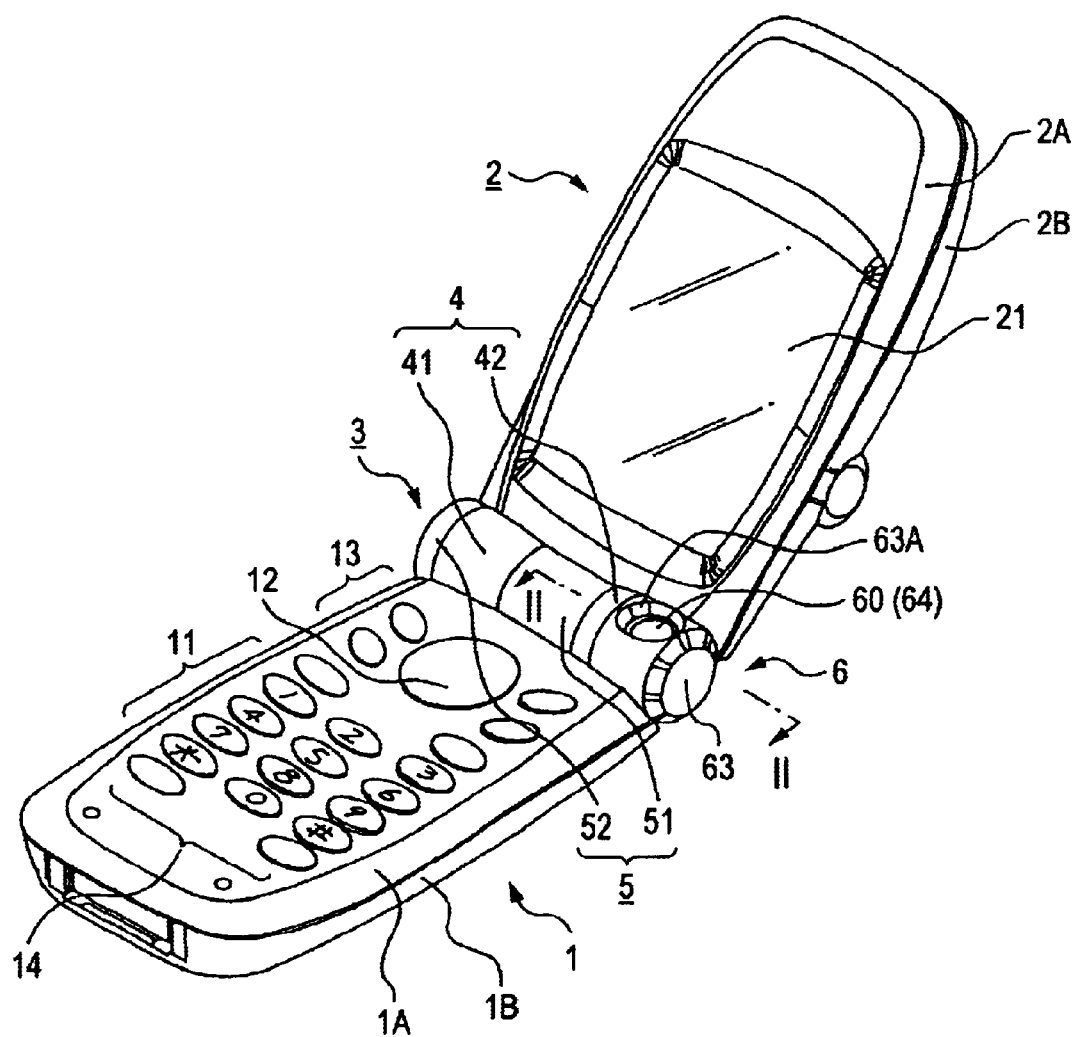
FIG. 1 is a perspective view showing a mobile phone set to which a mobile terminal device with a camera in an embodiment according to the present invention is applied.

For information, reference numerals in the drawings represent as follows; 1 is a lower case, 1A is an inner casing, 1B is an outer casing, 1C is an interior frame, 2 is an upper case, 2A is an inner casing, 2B is an outer casing, 2C is an interior frame, 3 is a hinge part, 4 is a lower hinge, 41 is a first rotary part (on the lower case side), 42 is a second rotary part (on the lower case side), 5 is an upper hinge, 51 is a first rotary part (on the upper case side), 52 is a second rotary part (on the upper case side), 53 is a socket portion (on the upper case side), 53A is a groove, 53B is a stopper, 6 is a photographing part, 61 is a lens barrel, 62 is a holder, 62C is a tubular portion, 62D is a groove, 63 is a cap, 63A is an open window, 64 is a lens cover, 66 is a printed circuit board, 67 is a flexible circuit board, 7 is an association mechanism, 71 is a connecting member (a member to be restricted), 71A is a cut-out, 72 is a collar (a second friction member), and 73 is an E-ring (or C-ring) (a first friction member).

BEST MODE FOR CARRYING OUT THE INVENTION

Now, a preferred embodiment according to this invention will be described in detail, referring to the drawings.

FIG. 1 shows a mobile phone set to which a mobile terminal device with a camera according to an embodiment of the present invention is applied, and this mobile phone set has a lower case 1, an upper case 2, a hinge part 3, and besides, a photographing part 6, and an association mechanism 7.

The lower case 1 has a structure composed of an inner casing 1A, an outer casing 1B, and an interior frame 1C (Refer to FIG. 2) which is formed of appropriate material such as magnesium. This lower case 1 is provided with an operating part having a plurality of buttons 11 including ten keypads, a cursor button 12, function buttons 13 such as a power button, a start button, a phone directory button, a clear button, etc., and a voice manner button 14, and a printed circuit board which is not shown in the drawings. In addition, a microphone which is not shown is provided adjacent to an end edge of the lower case 1.

The upper case 2 has a structure composed of an inner casing 2A, an outer casing 2B, and an interior frame 2C (Refer to FIG. 2) which is formed of appropriate material such as magnesium and screwed into the inner casing 2A. This upper case 2 is provided with a display part 21 composed of a liquid crystal display part on which a picture photographed by the camera in the photographing part 6 which will be described below can be shown, and a printed circuit board 66 (Refer to FIG. 2). At the same time, a speaker which is not shown in the drawings is provided adjacent to an end edge of the upper case 2. Various operating buttons may be provided on this upper case 2, though they are not provided in this embodiment.

The hinge part 3 is intended to connect the upper case 2 to the lower case 1 so as to be folded thereon, and includes, as a general structure, a lower hinge 4 which is integral with the lower case 1 and an upper hinge 5 which is integral with the upper case 2.

Of these components, the lower hinge 4 includes a first rotary member 41 in a semi-cylindrical (a long semi-cylinder) shape which is integrally projected from the above described inner casing 1A, a second rotary part 42 in a cylindrical (a short cylinder) shape, and a socket portion in a semi-cylindrical shape which is extended from the interior frame 1C and fitted to an inner peripheral face of the first rotary member 41 so as to be integrated therewith by pressure fitting or so, and a shaft member in a columnar shape (both of the socket portion and the shaft member are not shown).

The first rotary part 41 along with the second rotary part 42 holds the upper case 2 in such a manner that the upper case 2 can rotate along an axial direction in a stabilized state. The above mentioned shaft member provided on the first rotary part 41 is, integrally with the first rotary part 41, so adapted as to rotatably support a second rotary member 52 of the upper hinge 5 which will be described below.

The second rotary part 42 is integrally formed at an upper end of the interior frame 1C and rotatably supports the photographing part 6. Moreover, at the upper end of the interior frame 1C adjacent to this second rotary part 42, there is formed an auxiliary socket portion 43 in a shape of a projecting piece keeping in contact or leaving a slight clearance with respect to a first rotary part 51 of the upper hinge 5. This auxiliary socket portion 43 acts to support or guide rotary motion of the first rotary part 51, and is formed, in this embodiment, in a range of an arc corresponding to a central angle of approximately 45 degree, specifically, an arc length of about one eighth of an entire circumference.

On the other hand, the upper hinge 5 includes the first rotary part 51 in a semi-cylindrical (a long semi-cylinder) shape which is integrally formed with the above described outer casing 2B, the second rotary part 52 in a cylindrical (a short cylinder) shape which is formed of appropriate metal separately from the outer casing 2B and integrally fixed, by pressure fitting or so, to the interior frame 2C which will be described below, and a socket portion 53 (Refer to FIG. 2) in a semi-cylindrical shape (a long semi-cylinder) which is fitted to an inner peripheral face of the first rotary part 51 so as to be integrated therewith by pressure fitting or so.

Figure 2:
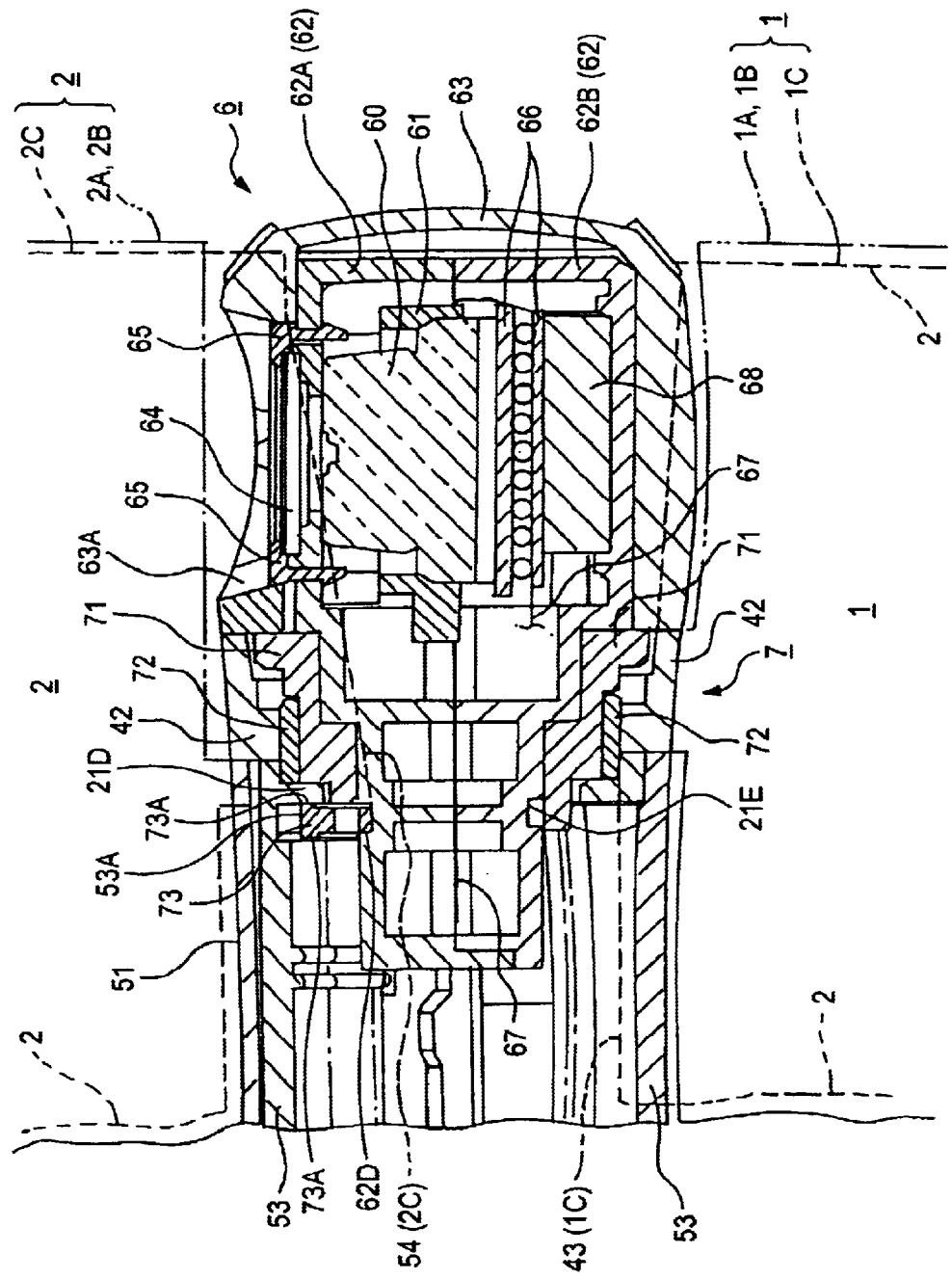
FIG. 2 is a sectional view taken along a line II—II of FIG. 1.

As shown in FIG. 2, the socket portion 53 which is integral with the first rotary part 51 is so constructed that it moves in association with the rotary movement of the upper case 2, and performs a rotary movement in a freely rotatable manner (integrally with the photographing part 6) with respect to a collar 72 which will be described below and the second rotary part 42 of the lower case 1. For this purpose, friction coefficient of the socket portion 53 with respect to an E-ring 73 is set to be larger (than friction coefficient between the collar 72 and the second rotary part 42 of the lower case 1).

Moreover, the interior frame 2C is provided with a pair of right and left auxiliary socket portions 54 (only the right one is shown in FIG. 2) in a projecting manner as shown by a dotted line in FIG. 2. Each of these auxiliary socket portions 54 is composed of a projecting piece projected substantially in an arc-like shape from a lower edge of the interior frame 2C, and adapted to support or guide the rotary movement of the upper case 2 in a stabilized manner keeping in contact or leaving a slight clearance with respect to the first rotary part 41 and the second rotary part 42. This auxiliary socket portion 54 is formed, in this embodiment, in a range of an arc corresponding to a central angle of approximately 45 degree, specifically, an arc length of about one eighth of an entire circumference.

Further, the lower hinge 4 and the upper hinge 5 are provided with stoppers (not shown) which are restricting members for restricting rotation range of the photographing part 6, and adapted to be engaged with a connecting member 71, which is a member to be restricted, in the association mechanism 7 which will be described below. In this embodiment, the stoppers are formed at two positions at an interval of 45 degree so that the connecting member 71 can rotate in a rage of about 270 degree.

Figure 3:
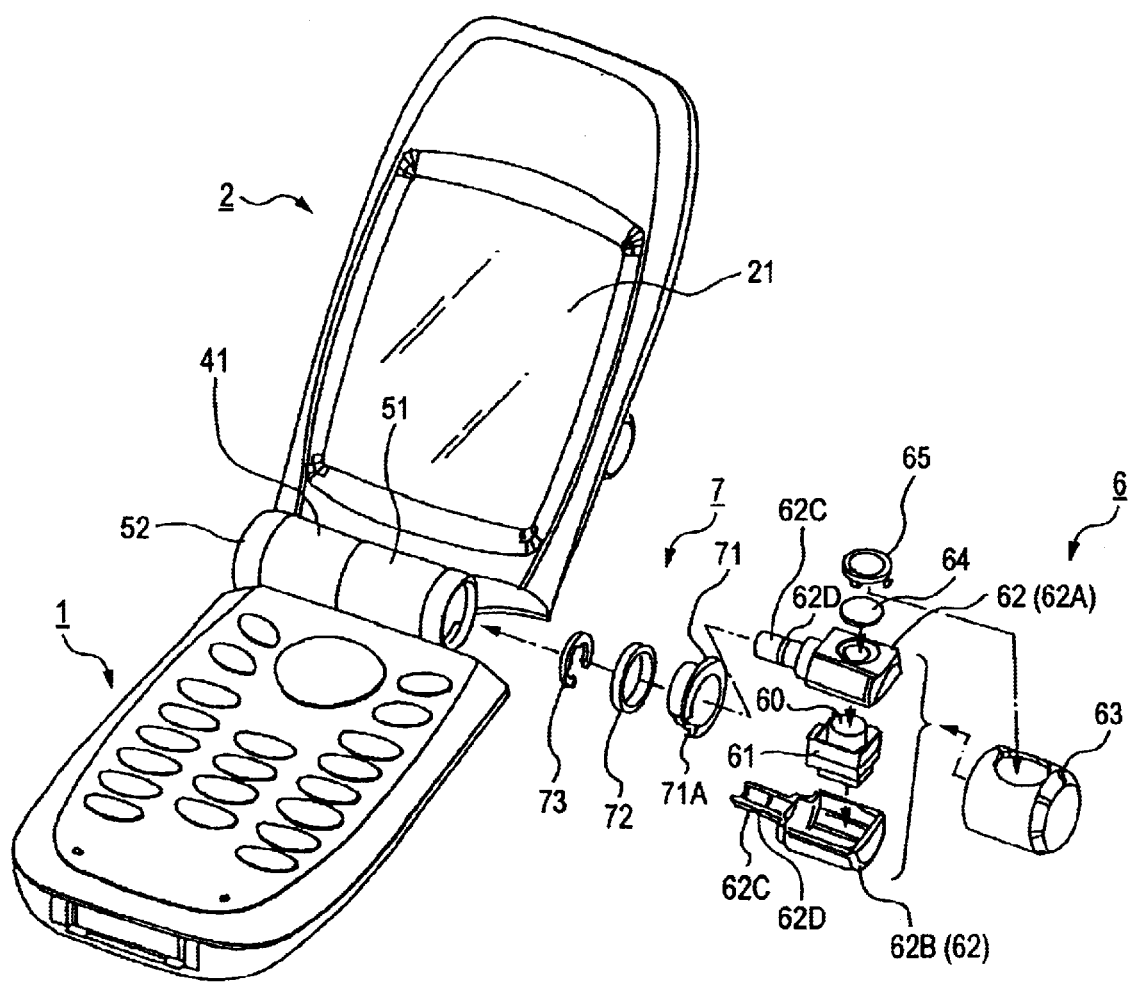
FIG. 3 is an exploded perspective view of an essential part of FIG. 1.

The photographing part 6 is provided so as to rotate with respect to the hinge part 3, and the rotation angle can be freely adjusted by the rotary movement of the upper case 2 and through its own rotary movement by grasping manipulation with fingers or the like. The photographing part 6 in this embodiment has, as shown in FIGS. 2 and 3, a lens barrel 61 for fixing a lens 60, a holder 62 for holding the lens barrel 61 which is divided into an upper part and a lower part, a cap 63 for covering this holder 62 from a side, a lens cover 64, and a ring 65 for retaining the cap 63 from withdrawal.

Figure 4:
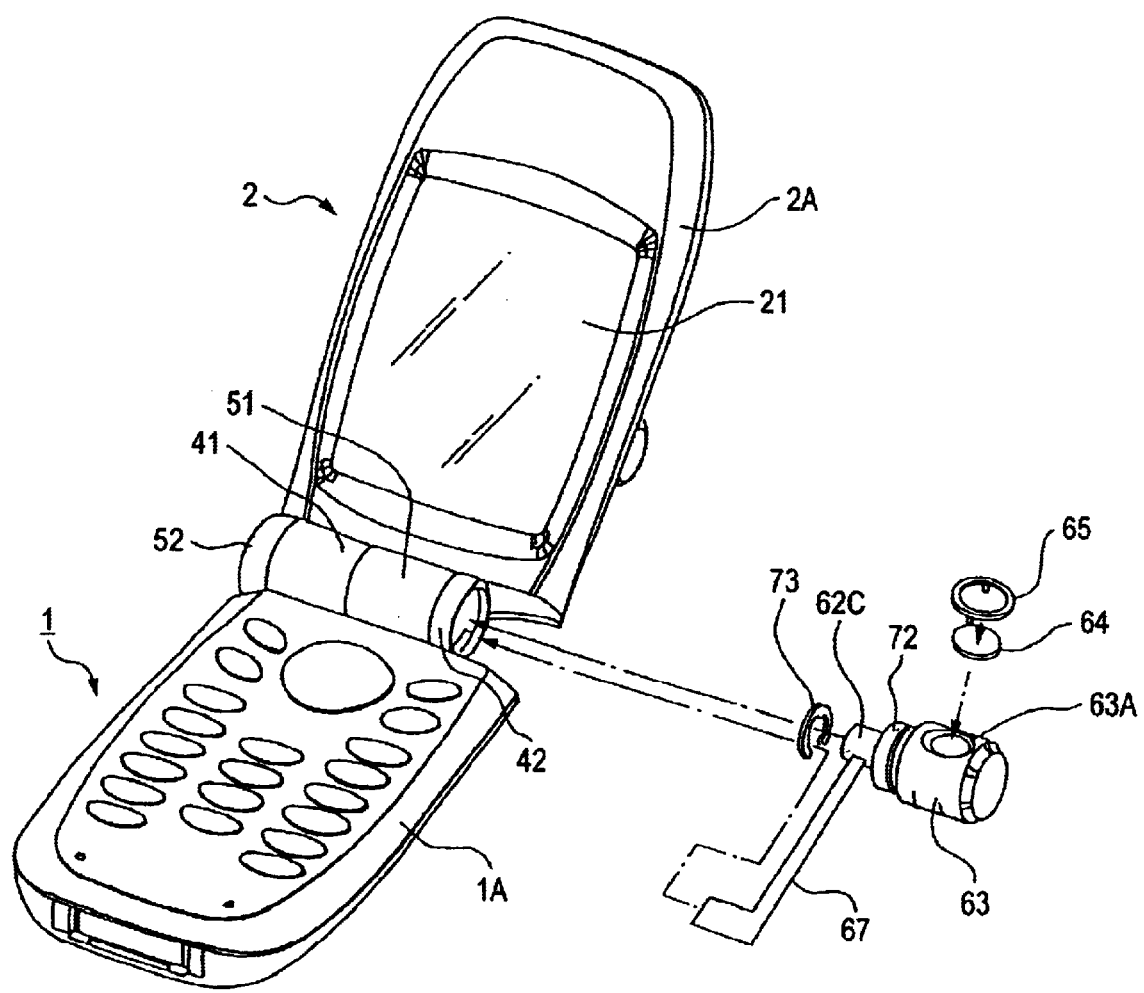
FIG. 4 is an explanatory view showing the essential part of FIG. 1 in an assembled state.

The holder 62 is composed of an upper holder 62A and a lower holder 62B joined together, and in a hollow space formed therebetween, there is contained the photographing (image forming) lens 60 fixed to the lens barrel 61 placed on a cushion material 68. In addition, a CCD which is not shown and a printed circuit board 66 mounting this CCD are placed on a focal point of the lens 60, inside this holder 62. Further, a flexible circuit board 67 is drawn out from this printed circuit board 66 for electrical connection between the CCD in the photographing part 6 and a printed circuit board in the upper case 2 (or in the lower case 1) which is not shown. Specifically, this flexible circuit board 67 is drawn out toward the hinge part 3, by way of a joint face between the upper holder 62A and the lower holder 62B, as shown in FIG. 4.

The cap 63 is provided with an open window 63A for making a light from an object to be photographed incident on the lens 60. With the opening and closing motions of the upper case 2 or rotating manipulation of the cap 63 clamped with fingers or the like, the photographing direction can be freely changed and set within a determined angle range.

The association mechanism 7 is intended to make the lens 60 exposed from the upper and lower cases 1 and 2 to the exterior, or received inside the upper and lower cases 1 and 2, and adapted to rotate the photographing part 6 in association with the opening and closing motions of the upper case 2 or manipulate the photographing part 6 to rotate with fingers or the like, as described above.

As shown in FIGS. 2 and 3, this association mechanism 7 has the connecting member 71 which is fitted around a tubular portion 62C extending from a side of the holder 62 of the photographing part 6, the collar 72 which is fitted around this connecting member 71, and the E-ring (or C-ring) 73.

The connecting member 71 is intended to hold the photographing part 6 so as to rotate with respect to the hinge part 3 and to rotate the photographing part 6 integrally with the upper case 2 with friction force ($\mu$). The connecting member 71 constitutes the member to be restricted from rotation so that the rotary movement of the photographing part 6 with respect to the lower case 1 may be allowed only within a certain range. Specifically, this connecting member 71 is provided with a cut-out 71A, as shown in FIG. 3, along a part of its outer circumference, in such a manner that an area corresponding to 45 degree of the central angle is cut away. When either face of this cut-out 71A is locked with either of the above described stoppers of the restricting member, further rotation of the connecting member 71 will be blocked.

Therefore, when the upper case 2 is closed with the rotary movement, the connecting member 71 moves in association with the upper case 2 until it is locked by the stopper of the restricting member. However, being locked in this manner, the connecting member 71 will no more move in association with the upper case 2, but the upper case 2 only will continue to rotate.

On the other hand, when the upper case 2 is opened from the closed state along with the rotary movement, the connecting member 71 will make the rotary movement from the position held, in association with the upper case 2. Because this connecting member 71 is locked with the stopper of the restricting member from the rotation over a certain angle, the lens 60 in the photographing part 6 which rotates integrally with the connecting member 71 is always directed to a position within the predetermined angle range with respect to the upper case 2, when the upper case 2 is opened. In this manner, work for adjusting the position of the lens 60 when the upper case 2 is opened can be simplified, and operability of the lens can be enhanced.

The collar 72 is interposed between an inner peripheral face of the second rotary part 42 constituting a part of the lower hinge part 4 which is integrally provided with the interior frame 1C of the lower case 1, and an outer peripheral face of the connecting member 71. This collar 72 constitutes the second friction member. Specifically, this collar 72 is formed of appropriate metal material, and designed in such a manner that when the upper case 2 performs the rotary movement, the socket portion 53 integral with the upper case 2 and further, the connecting member 71 may rotate in a rotatable state relative to this collar 72. For this purpose, provided that this collar 72 has a maximum friction coefficient of $\mu 1$ with respect to the inner peripheral face of the second rotary part 42, and a maximum friction coefficient of $\mu 2$ with respect to the outer peripheral face of the connecting member 71, the below described E-ring 73 has the following relations to maximum friction coefficients $\mu 3$ and $\mu 4$ with respect to the socket portion 53 adjacent to the upper case 2 and the tubular portion 62C of the holder 62.

$$\mu 1 < \mu 3 \tag{1}$$

$$\mu 2 < \mu 3 \tag{2}$$

or $$\mu 1 > \mu 4 \tag{3}$$

$$\mu 2 > \mu 4 \tag{4}$$

On the other hand, the E-ring 73 is formed in a substantially cylindrical shape, and interposed between the socket portion 53 adjacent to the upper case 2 which is pressure fitted to the inner peripheral face of the first rotary part 51 constituting a part of the upper hinge 5, and the tubular portion 62C of the holder 62. Specifically, this E-ring is engaged in a groove 62D of the tubular portion 62C of the holder 62 and engaged in a groove 53A formed in the socket portion 53 adjacent to the upper case 2 to serve as a retention for the photographing part 6 from withdrawal.

Moreover, this E-ring 73 is provided with bulging portions 73A projected in a flange-like shape on both faces of its edge, and the bulging portions 73A are adapted to come into a linear contact with the groove in the socket portion 53. Particularly, this E-ring 73 constitutes the first friction member, because the E-ring 73 rotates integrally with the socket portion 53 (further with the connecting member 71)

by means of the friction power with respect to the socket portion 53 integrated with the upper case 2, when the upper case 2 performs the rotary movement. For this purpose, the friction coefficient of the E-ring 73 is set to be larger than that of the collar 72 which is the second friction member.

Specifically this E-ring is so designed that the above described relations (1) and (2) or (3) and (4) may be satisfied, provided that the friction coefficients of this E-ring with respect to the socket portion 53 adjacent to the upper case 2 and the tubular portion 62C of the holder 62 are respectively $\mu 3$ and $\mu 4$.

Moreover, in this E-ring 73 which is the first friction member, the maximum friction forces with respect to the socket portion 53 and the tubular portion 62C of the holder 62 are set to be smaller than the manipulation force for rotating them with fingers, and thus, the operator can reliably operate the photographing part 6 to rotate by the manipulation with the fingers.

It is to be noted that the E-ring 73 in this embodiment is formed of appropriate synthetic resin material having resiliency to a certain extent in a radial direction, and adapted to ride over the stopper 53B provided in the socket portion 53 so that the E-ring can be engaged in the groove 53A which is formed inward of the stopper 53B.

Now, operation of the mobile phone set with the camera according to this embodiment will be described.

In a state of non use in which the mobile phone set is folded for example, the open window 63A of the lens in the photographing part 6 is positioned at a joint face between both inner faces of the lower case 1 and the upper case 2. In other words, the open window 63A is completely covered with both the cases so that an exterior light cannot enter into the open window 63A, and thus, it is impossible to photograph.

Figure 5:
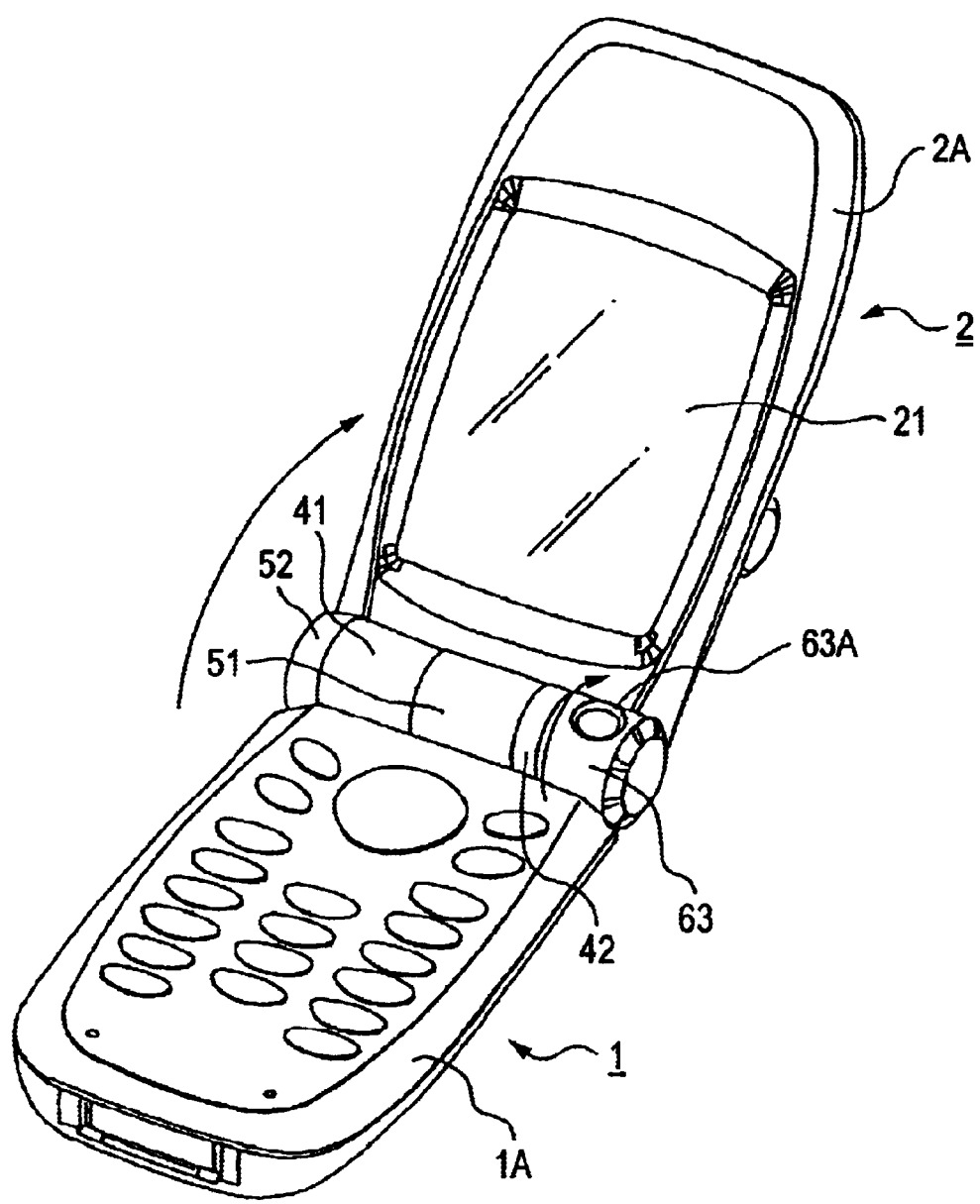
FIG. 5 is an explanatory view showing operation of the mobile phone set of FIG. 1.

Then, when the operator wants to send, for example, an image of the operator himself to a third person, he will first open the mobile phone set which has been folded. Specifically, he goes on opening the upper case 2, holding the lower case 1 with his one hand, while the upper case 2 is grasped by the other hand. With this operation, by way of the association mechanism 7 which moves in association with the rotary movement of the upper case 2, the photographing part 6 also is rotated by the same angle in the same direction, as shown in FIG. 5.

As the upper case 2 is rotated, the first rotary part 51 integral with this upper case 2 and the socket portion 53 which is pressure fitted to the inner peripheral face thereof will go on rotating simultaneously in the same direction. Accordingly, the E-ring 73 in contact with the socket portion 53 in FIG. 2, will be rotated integrally with the socket portion 53 with the friction force, and by way of this E-ring 73, the holder 62 and further, the photographing part 6 are rotated integrally with the upper case 2.

Therefore, for example, in the case where the operator has set the photographing direction with respect to the upper case 2 in an optimum condition beforehand, relative angle of the photographing part 6 with respect to the upper case 2 will not be changed by conducting the rotating operation to open the mobile phone set. Accordingly, each time when the upper case 2 is erected to a certain angle, for example 90 degree, the photographing direction of the photographing part 6 (orientation of the CCD camera) can be set at the certain angle.

Also on this occasion, in the case where more accurate fine adjustment of angle of the photographing direction is desired, the holder 62 of the photographing part 6 can be rotated at the same angle by operating to rotate only the upper case 2. With this operation, the fine adjustment can be performed more easily as compared with the case in which the adjustment is carried out by grasping the small holder 62 with fingers. This is because the outermost edge of the upper case 2 which is remote from the rotation axis can ensure a larger stroke with respect to the same rotation angle than the small holder 62 which is close to the rotation axis.

It is apparent that alternatively, the fine angle adjustment can be conducted by grasping the photographing part 6 with one hand while the lower case 1 or the upper case 2 is fixed with the other hand, and by operating the photographing part 6 for rotation.

Thereafter, when the mobile phone set ceases to be used after finishing the operation of photographing and so on, the upper case 1 can be simply rotated toward the lower case 2 so as to be folded. Along with this movement, the photographing part 6 is rotated in association with the upper case 1, and the open window 63A will be completely covered with the upper case 1 and the lower case 2. Thus, such a trouble that the open window 63A may get dirty or broken can be prevented.

Moreover, because the open window 63A is completely covered with the upper case 1 and the lower case 2, even in the case where an off operation of the power is forgotten, it is also possible to prevent such a trouble that an unnecessary picture is taken by the photographing part 6 unconsciously, and transmitted to a third person.

The present application is based on Japanese Patent Application No. 2001-164923 filed on May 31, 2001, the contents of which are hereby incorporated by reference.

INDUSTRIAL APPLICABILITY

As has been described hereinabove, according to this invention, there is provided the mobile terminal device with the camera comprising the lower case provided with the operating part, the upper case provided with the display part, the hinge part for connecting the upper case with the lower case in a foldable manner, and the photographing part rotatably installed in the hinge part, in which there is provided the association mechanism which can rotate the photographing part in association with opening and closing motions of the upper case.

Therefore, the orientation of the camera can be easily adjusted in association with the opening and closing motions of the upper case, and after the photographing operation of the camera has been finished, the camera can be automatically closed in association with the folding motion of the cases of the mobile terminal device. Accordingly, the camera can be protected from the exterior, and such a trouble that the lens or the cover glass of the camera may get dirty or broken while being carried can be prevented. Thus, reliability of the mobile terminal device can be enhanced.

What is claimed is:

1. A mobile terminal device with a camera comprising a lower case provided with an operating part, an upper case provided with a display part, a hinge part for connecting said upper case with said lower case in a foldable manner, and a photographing part installed in said hinge part, wherein there is provided an association mechanism by which said photographing part is rotated in association with opening and closing motions of said upper case, and wherein said hinge part includes an upper hinge which is integral with said upper case and a lower hinge which is integral with said lower case, and wherein said association mechanism includes a first friction member provided between said upper hinge and said photographing part, and wherein said first friction member has friction coefficient which is larger than friction coefficient between said lower hinge and said photographing part.

2. The mobile terminal device with a camera as claimed in claim 1, wherein said association mechanism includes a second friction member provided between said first friction member, said lower hinge and said photographing part, and wherein the friction coefficient of said first friction member is larger than friction coefficient of said second friction member.

3. The mobile terminal device with a camera as claimed in claim 2, wherein said first friction member includes a C-ring or an E-ring.

4. The mobile terminal device with a camera as claimed in claim 3, wherein said C-ring or E-ring is provided with a bulging portion on a circumferential edge, said bulging portion being adapted to come into a point contact with said upper hinge.

5. The mobile terminal device with a camera as claimed in claim 1, wherein said upper hinge and said lower hinge are provided with restricting members for restricting rotation range of said photographing part, and wherein said photographing part is provided with a member to be restricted by said restricting member so that said rotation range of said photographing part is restricted.

6. The mobile terminal device with a camera as claimed in any one of claim 1, claim 2, claim 3, claim 4, and claim 5, wherein a housing of said photographing part is formed by joining an upper housing and a lower housing, and a flexible circuit board for electrical connection between an interior of said photographing part and said upper or lower case is drawn out through a joint portion between said upper and lower housings.

* * * * *

UNITED STATES PATENT AND TRADEMARK OFFICE
CERTIFICATE OF CORRECTION

PATENT NO. : 6,879,337 B2
DATED : April 12, 2005
INVENTOR(S) : Tatehana et al.

It is certified that error appears in the above-identified patent and that said Letters Patent is hereby corrected as shown below:

Title page,
Item [22], please delete
"PCT Filed:   Aug. 16, 2002" and insert therefor
-- PCT Filed:   Apr. 16, 2002 --.
Item [57], ABSTRACT,
Line 6, after "rotatably", please insert -- installed in the hinge part 3, wherein there is provided --.

Column 2,
Line 52, please delete "point contact" and insert therefor -- linear contact --.

Column 7,
Line 20, please delete "53B".
Line 20, please delete "socket portion 53" and insert therefor -- tubular portion 62C --.
Line 21, please delete "53A" and insert therefor -- 62D --.
Line 22, please delete "stopper 53B" and insert therefor -- tubular portion 62C --.

Column 8,
Line 11, beginning with "upper case 1", please delete "1" and insert therefor -- 2 --.
Line 11, beginning with "upper case 1", please delete "2" and insert therefor -- 1 --.
Line 13, beginning with "1, and the open window", please delete "1" and insert therefor -- 2 --.
Line 14, beginning with "with the upper case", please delete "1" and insert therefor -- 2 --.
Line 14, beginning with "with the upper case", please delete "2" and insert therefor -- 1 --.
Line 18, please delete "1" and insert therefor -- 2 --.
Line 18, please delete "2" and insert therefor -- 1 --.

Column 9,
Line 14, please delete "point contact" and insert therefor -- linear contact --.

UNITED STATES PATENT AND TRADEMARK OFFICE
CERTIFICATE OF CORRECTION

PATENT NO. : 6,879,337 B2
DATED : April 12, 2005
INVENTOR(S) : Tatehana et al.

It is certified that error appears in the above-identified patent and that said Letters Patent is hereby corrected as shown below:

Column 10,
Line 8, please delete "any one of".
Lines 8 and 9, please delete "claim 2, claim 3, claim 4, and claim 5,".

Signed and Sealed this

Fifth Day of July, 2005

JON W. DUDAS
*Director of the United States Patent and Trademark Office*